United States Patent [19]
Westbrook et al.

[11] Patent Number: 5,340,392
[45] Date of Patent: Aug. 23, 1994

[54] METHOD AND PRODUCT OF CALCIUM SULFATE DIHYDRATE AS FILLER IN AQUEOUS POLYMER DISPERSIONS

[75] Inventors: C. Eric Westbrook, Dalton, Ga.; Nelson Severinghaus, Nashville, Tenn.

[73] Assignee: Franklin Industries, Inc., Nashville, Tenn.

[21] Appl. No.: 911,631

[22] Filed: Apr. 24, 1992

Related U.S. Application Data

[63] Continuation-in-part of Ser. No. 690,826, Apr. 26, 1991, abandoned.

[51] Int. Cl.$^5$ ............................................. C09C 1/02
[52] U.S. Cl. ...................... 106/471; 106/670; 106/658; 106/772; 106/461; 524/423; 524/915; 528/935; 428/95; 428/97
[58] Field of Search ............... 106/658, 670, 461, 471; 524/915, 423; 528/935; 428/95, 97

[56] References Cited

U.S. PATENT DOCUMENTS

| | | | |
|---|---|---|---|
| 3,951,900 | 4/1976 | Bath | 260/29.7 |
| 4,049,587 | 9/1977 | Straka | 260/2.5 L |
| 4,172,917 | 10/1979 | Angelle et al. | 428/95 |
| 4,251,416 | 2/1981 | Palmer | 260/29.7 S |
| 4,483,962 | 11/1984 | Sadowski | 524/552 |
| 4,534,892 | 8/1985 | Suzuki et al. | 252/545 |
| 4,751,024 | 6/1988 | Shu et al. | 252/601 |
| 4,904,503 | 2/1990 | Hilton et al. | 427/373 |

*Primary Examiner*—Mark L. Bell
*Assistant Examiner*—Scott L. Hertzog
*Attorney, Agent, or Firm*—Longacre & White

[57] ABSTRACT

This invention relates to a method and composition for the incorporation of gypsum as a filler material in aqueous polymer dispersions by means of the addition of a detergent selected from the group consisting of ammonium lauryl sulfate, sodium lauryl sulfate, ammonium laureth sulfate, and sodium laureth sulfate.

35 Claims, 9 Drawing Sheets

Figure 9

METHOD AND PRODUCT OF CALCIUM SULFATE DIHYDRATE AS FILLER IN AQUEOUS POLYMER DISPERSIONS

This application is a continuation-in-part of Ser. No. 07/690,826, filed Apr. 26, 1991, now abandoned.

BACKGROUND OF THE INVENTION

1. Field of the Invention

This invention relates to a method and composition for the incorporation of calcium sulfate dihydrate as a filler material in latex compounds. The term latex in the context of this invention is used to describe a broad class of aqueous polymer dispersions such as styrene/butadiene rubber, ethylene vinyl acetate, and styrene/butadiene/vinylidene chloride rubber. This invention addresses the solubility problem associated with calcium sulfate dihydrate when used as a filler in aqueous compounding applications. The composition is comprised of calcium sulfate dihydrate, latex, and a detergent blend, the detergent blend selected in part from the group consisting of lauryl sulfate and laureth sulfate. This invention has particular applicability for use as a carpet backing.

2. Description of the Prior Art

The majority of the carpet manufactured in the United States is tufted carpeting. The basic manufacturing method involves tufting (looping various kinds of yarns such as nylon, polyester, wool, or others) by using machines which punch the thread through a primary backing, which is typically a synthetic woven polypropylene. Once the carpet has been tufted, usually in twelve or fifteen foot wide rolls, the tufts must be locked to the primary backing to keep them from pulling out. This is accomplished by an adhesive system, usually with a styrene-based polymer dispersion (or latex) system extended with up to six parts ground limestone.

Following this step, a secondary backing, normally jute or a woven polypropylene, is applied to the carpet. This secondary backing is bonded to the primary backing along with its surface fiber system with a second latex adhesive system. The complete system is then passed through an oven to cure the adhesive compound and complete the backing system. The face of the carpet may be complete at this point or it may be cut to give a cut pile surface or sculptured to give varying depths to the surface of the carpet before it is finally rolled and wrapped as a piece of finished carpeting.

Crushed limestone is used to extend the more costly latex in the production of carpet backing compounds. Some consumer markets such as nursing homes and other health related facilities, automobiles, airlines, and public applications in general require carpet which meets or exceeds established flame resistance standards. In order to pass these standards, carpet manufacturers have for many years replaced some or all of the limestone latex extender with alumina trihydrate (ATH).

ATH functions as a flame retardant during its endothermic dehydration to aluminum oxide and water as shown by the chemical equation below:

$$2[Al(OH)_3] \rightarrow Al_2O_3 + 3H_2O$$

During this dehydration, the filler functions as a heat sink, absorbing some of the heat of combustion in addition to diluting the flame with the Released water. The amount of alumina trihydrate used varies depending on the latex system being used, the type of carpet fiber being used, the fiber density of the finished carpet, and the requirements of the end product user.

While effective as a fire retardant, alumina trihydrate is expensive, with a cost as much as ten times that of ground limestone. Consequently, there is a need to find a less costly substitute for aluminum trihydrate that will be as effective a fire retardant.

Calcium sulfate dihydrate, also referred to as gypsum, is one possible fire retardant substitute for aluminum trihydrate. Gypsum has two moles of water as described by the chemical formula $CaSO_4-2H_2O$. This filler also undergoes an endothermic reaction during hydration, albeit with less molecular water liberated per unit mass (20.9% versus 34.6%). While alumina trihydrate releases more water per unit mass, gypsum releases its water at a lower temperature. With gypsum, complete water loss occurs at 325 degrees Fahrenheit while dehydration of aluminum trihydrate is only 80% complete at 572 degrees Fahrenheit. Thus, the flame retardant mechanism of gypsum initiates earlier than that of aluminum trihydrate.

The difficulty with using gypsum as a filler in adhesive compounds is that the high solubility of gypsum results in a high concentration of dissolved ions. The interactions of these ions with the adhesive polymer causes an unacceptable increase in compound viscosity, even to the point of solidification.

There have been numerous attempts to use gypsum as a filler material in spite of this problem.

U.S. Pat. No. 3,951,900 (Bath) attempts to overcome the problem of coagulation of the gypsum-filled compound by adding any non-ionic surface active agent to the polymer dispersion and mixing therewith prior to the addition of the gypsum. According to the disclosure, the modified polymer dispersion is stabilized relative to the addition thereto of gypsum, and consequently when the gypsum powder is added there is no compound coagulation. The patent calls for the addition of sodium glucoheptonate, a non-phosphate sequestering agent, to be thoroughly mixed with the gypsum powder to facilitate compound dispersion, decreasing substantially the tendency of the gypsum powder to form lumps which can be difficult to break and disperse.

U.S. Pat. No. 4,251,416 (Palmer) teaches the addition of approximately 0.5% to 5% by weight of ammonium sulfate or sodium sulfate or a mixture of the two to the latex prior to the addition of the gypsum to a styrene-butadiene rubber latex in order to prevent coagulation.

However, different manufacturers have different latex formulations and subsequently, each latex produced may have different physical and chemical properties. Consequently, the teachings of U.S. Pat. No. 4.,251,416 and U.S. Pat. No. 3,951,900 only work for very specific latexes.

The present invention proposes using lauryl sulfate or laureth sulfate as a detergent to prevent the dissolved ions of the gypsum from reacting with latex systems to the detriment of the entire compound system.

Various types of lauryl sulfates have previously been used with either latex or gypsum, but never in a latex solution to prevent the dissolved ions of gypsum from causing coagulation.

U.S. Pat. No. 4,172,917 (Angelle et al.) calls for a temporary carpet having a latex foam cushion made from a composition comprised of styrene-butadiene rubber, a surfactant, a curing agent and a filler. The filler is alumina tri-hydrate and calcium carbonate, the surfactant is di-sodium N-Octadecyl sulfosuccinamate, and the curing agent is comprised of sulfur, ethyl zimate, zenite, and zinc. Other chemicals that are added to the solution but for which no explanation is given include potassium hydroxide solution, water, tri-sodium phosphate solution, aluminum hydroxide, and sodium lauryl sulfate. Gypsum is not added to the solution.

U.S. Pat. No. 4,049,587 (Straka) provides for the preparation of a cellular elastomeric product by the curing of a froth prepared by whipping air into an aqueous dispersion of colloidal elastomer, the aqueous dispersion containing a latex frothing agent consisting of an aqueous solution containing approximately 70% water, approximately 25% magnesium di(lauryl sulfate), approximately 2.5% polyalkoxyglycerol and approximately 2.5% of a quaternary dihydroimidazole derivative. No gypsum is added to this solution, nor is any ammonium or sodium lauryl sulfate or laureth sulfate used.

In U.S. Pat. 4,904,503 (Hilton et al.), a sprayable fireproofing composition is taught whereby the setting time of a spray applied hydraulic cement-based fireproofing composition is decreased substantially while the yield of the composition increases. The composition is comprised of a slurry of a hydraulic cement-based fireproofing composition consisting essentially of a hydraulic cement binder from a group which includes gypsum, an acidic set accelerating agent, and a foaming agent such as sodium lauryl sulfate. In U.S. Pat. No. 4,751,024 (Shu et al.), a similar invention as that of U.S. Pat. No. 4,904,503, a fireproofing composition is comprised in part of a hydratable cementitious binder, which is preferably gypsum, and a foaming agent which may be sodium lauryl sulfate. In neither of these invention is there the addition of or mixing with a polymer dispersion.

SUMMARY OF THE INVENTION

The present invention is for a composition and a method for the incorporation of calcium sulfate dihydrate as a filler material in latex using ammonium and sodium lauryl and laureth sulfates as detergents to prevent the coagulation of the adhesive compound. Unlike U.S. Pat. No. 4,251,416, this invention can be used for most latexes produced by different manufacturers.

Unlike U.S. Pat. Nos. 4,751,024, 4,904,503, 4,172,917, and 4,049,587, the ammonium and sodium lauryl sulfates are being used to prevent the calcium sulfate dihydrate from initiating coagulation while being used as a filler with a latex.

The composition which allows for calcium sulfate dihydrate to be maintained in an aqueous solution is comprised of calcium sulfate dihydrate, water, and a detergent blend, the detergent blend being selected in part from the group consisting of lauryl sulfate and laureth sulfates. The lauryl sulfate is comprised of a mixture of 0–100% by weight ammonium lauryl sulfate and 0–100% by weight sodium lauryl sulfate. In another embodiment, the laureth sulfate is comprised of a mixture of 0–100% by weight ammonium laureth sulfate and 0–100% sodium laureth sulfate. The detergent blend may be further comprised of a dispersant such as sodium hexametaphosphate (SHMP) and tetrasodium pyrophosphate.

The composition for incorporating calcium sulfate dihydrate as a filler material in latex is comprised of calcium sulfate dihydrate, latex, and a detergent blend with the detergent blend selected in part from the group consisting of lauryl sulfate and laureth sulfate. The lauryl sulfate is comprised of a mixture of 0–100% by weight of ammonium lauryl sulfate and 0–100% by weight sodium lauryl sulfate. In another embodiment of the invention, the detergent blend using laureth sulfate is comprised of a mixture of 0–100% by weight ammonium laureth sulfate and 0–100% by weight sodium laureth sulfate. The mixture of ammonium and sodium lauryl sulfates has an active dosage rate of approximately 0.1 to 5.0 parts per hundred rubber (phr); the active dosage rate for the mixture of ammonium and sodium laureth sulfates is also 0.1 to 5.0 phr. The optimum dosage rate for both lauryl and laureth sulfates is approximately 0.1 to 0.5 phr. Additionally, the detergent blend in either case may be further comprised of a dispersant selected from the group consisting of sodium hexametaphosphate and tetrasodium pyrophosphate. The calcium sulfate dihydrate can comprise up to 100% by weight of the filler blend, but is typically mixed with calcium carbonate so as to comprise up to 50% by weight of the filler blend. The calcium sulfate dihydrate, which has a size of approximately 50% to 55% −325 mesh, is typically added to the latex at a rate of approximately 50 to 400 phr with a maximum rate of approximately 600 phr. The composition for the incorporation of calcium sulfate dihydrate may be further comprised of approximately 1 phr to 2 phr of froth aid, thereby enabling the compound to be frothed with air and maintain bubble stability. A thickening agent, such as sodium polyacrylate, may be further added to adjust the viscosity of the composition. The final viscosity of the composition should be in the range of approximately 10,000 to 18,000 cps, and would typically have a pH of approximately 7.0 to 8.5.

Calcium sulfate dihydrate is incorporated as a filler material in latex by adding to the polymer dispersion a detergent blend selected in part from a group consisting of lauryl sulfate and laureth sulfate and the required dilution water (to achieve the desired final compound concentration). Calcium sulfate dihydrate is added to the diluted and treated latex under agitation at ambient temperature.

In the method for incorporating calcium sulfate dihydrate into the latex solution, the froth aid previously discussed may be added after dispersion of the filler. The dispersant such as sodium hexametaphosphate and tetrasodium pyrophosphate may be added with the detergent blend. Additionally, the filler blend may include calcium carbonate, which may be added to the compound after the addition of the calcium sulfate dihydrate. At the end of the process for incorporating calcium sulfate dihydrate, a thickening agent such as sodium polyacrylate is added to the solution. The filled latex solution is adjusted to a viscosity of approximately 10,000 to 18,000 cps.

Initial development with this invention began using a styrene/butadiene/vinylidene chloride latex. Although work was also done with ethylene vinyl acetate, the bulk of the invention development was done using styrene/butadiene rubber (SBR) latex. All examples referenced hereafter will be compounds made from various latex manufacturers of carboxylated SBR aqueous dispersions.

The latex products, which are referenced by company name in the supporting examples, are given below as their specific product names:

| COMPANY | PRODUCT NAME |
|---|---|
| Dow Chemical Company | Latex LXC 8305NA |
| Goodyear Chemicals | LPR6632WS |
| Reichhold Chemicals | Tylac 69727 |
| GenCorp Polymer Products | Genflo 7121 |
| BASF Corporation | Styrofan ND552 |

Henceforth, the latex products are referred to as Dow, Goodyear, Reichhold, Gencorp, and BASF.

DETAILED DESCRIPTION OF THE PREFERRED EMBODIMENTS

The primary goal of the invention was to develop a suitable method for using gypsum in polymer dispersions as a fire retardant filler in place of aluminum trihydrate. Several factors needed to be considered with gypsum:

1. Gypsum is a water soluble and therefore reactive filler. The problem of compound stability was foremost.
2. AS gypsum contains 2 moles of water while aluminum trihydrate contains 3 moles on a wt:wt basis, there was the question as to whether gypsum can effectively serve as a flame retardant as opposed to aluminum trihydrate.
3. There was also the issue as to whether gypsum affects the strength of the compound.

The initial studies for the use of gypsum in latex began with a strength test. More specifically, a tensile testing of thin filled latex films was conducted. In a test typically used for screening prior to more extensive testing, such as producing and testing sample pieces of carpet, the latex was filled with the filler blend and the film was cast with a draw bar (gap=0.20") on a teflon covered board. The film was air-dried overnight and oven cured for 10 minutes at approximately 210 degrees Fahrenheit. The test was conducted at 70 degrees Fahrenheit at approximately 65% relative humidity. The test speed at which the experiments were conducted was 500 mm/minute. Latex manufactured by the Dow Chemical Company was used for these tests. In the test results given below, the percent of filler comprised of Amical 1 limestone is represented by the column A-1, the percent of filler comprised of gypsum is represented by FR50, and tenacity is the breaking load divided by the cross sectional area of the thin film. Below are the results from applicable tensile testing performed by an outside testing laboratory.

| Test # | Specimen Thickness | % A-1 | % FR50 | Tenacity |
|---|---|---|---|---|
| 1 | .021" | 100 | 0 | 381 |
| 2 | .021" | 50 | 50 | 374 |
| 3 | .023" | 0 | 100 | 413 |
| 4 | .019" | 100 | 0 | 380 |
| 5 | .021" | 50 | 50 | 413 |
| 6 | .019" | 100 | 0 | 493 |
| 7 | .018" | 50 | 50 | 502 |

NOTE:
Films are segregated by groups that were done together.

These tests indicate that the strength of the latex is not adversely affected by the use of gypsum in the filler blend. As the comparative tests show, the fillers using gypsum have an even greater tensile strength than those using limestone.

Further work was done to test the gypsum blend in actual carpet samples. The compounds were prepared the night prior to the preparation of the carpet samples.

In the chart below, delamination is the force necessary to pull the secondary backing from the carpet in a needle punch weave carpet, the tuft bind measurement indicates how well the yarn is secured, and in the burn test known as the radiant panel test (ASTM E648-86) the carpet is glued down and exposed to a hot patch.

| Sample | Delamination lbs/in | Tuft Bind lbs | Burn Test cm | Coat Weight oz/sq-yd |
|---|---|---|---|---|
| Nylon tufted cut pile carpet (unfrothed compound) | | | | |
| 100% A-1 | 4.1 | 3.6 | 36 | 29.3 |
| 33% ATH | 3.3 | 2.8 | 35 | 20.9 |
| 55% FR50 | 5.0 | 2.9 | 36 | 28.2 |
| Olefin level loop pile carpet (unfrothed compound) | | | | |
| 100% A-1 | 3.5 | 6.8 | 49 | 38.3 |
| 33% ATH | 3.3 | 4.6 | 50 | 31.6 |
| 55% FR50 | 3.1 | 5.6 | 52 | 32.7 |
| Nylon tufted cut pile carpet (frothed compound) | | | | |
| 100% A-1 | 5.4 | 2.9 | n/a | 28.5 |
| 33% ATH | 5.5 | 2.8 | n/a | 23.8 |
| 55% FR50 | 7.0 | 2.2 | n/a | 27.0 |
| Olefin level loop pile carpet (frothed compound) | | | | |
| 100% A-1 | 4.1 | 6.0 | 47 | 25.0 |
| 33% ATH | 3.4 | 5.1 | 50 | 24.6 |
| 55% FR50 | 3.3 | 5.3 | n/a | 24.3 |

While the sample coating process is somewhat variable as shown by the fluctuating coating weights, the tests indicate that the gypsum blend compounds are generally equivalent to the ATH blend compounds. The ratios of ATH and gypsum give an equivalent water content; 33% ATH would be equivalent to 200 phr for a 600 phr filler loading.

The radiant panel test (ASTM E648-86) is not sensitive enough to differentiate between the different backing compounds. Therefore, a second burn test known as the Federal Motor Vehicle Safety Standard No. 302 which is used for automotive interior materials was used to distinguish amount the performance of the compounds. Below are the results from the testing of the Olefin level loop pile carpet.

| Sample | Length Burn in/min | Width Burn in/min | Coat Weight oz/sq-yd | Normalized Length burn rate in/min |
|---|---|---|---|---|
| Unfrothed compound samples | | | | |
| 100% A-1 | 1.1 | 1.0 | 38.3 | 1.0 |
| 33% ATH | 0.9 | 0.8 | 31.6 | 0.8 |
| 55% FR50 | 0.7 | 0.8 | 32.7 | 0.6 |
| Frothed compound samples | | | | |
| 100% A-1 | 1.7 | 1.3 | 25.0 | 1.0 |
| 33% ATH | 1.3 | 1.0 | 24.6 | 0.8 |
| 55% FR50 | 0.8 | 0.9 | 24.3 | 0.5 |

The test results shown above indicate that gypsum is superior to aluminum trihydrate under these conditions. This is probably due to the lower temperature of molecular dehydration, which may result in a lower flame temperature.

COMPOUND STABILITY TEST RESULTS

Lauryl sulfates are detergents which are prepared by the sulfation of lauryl alcohol and neutralized by sodium or ammonium bases. Lauryl alcohol is insoluble in water but this process converts it to a water soluble anionic compound. The addition of the lauryl sulfates appears to temporarily render the dissolved ions from the gypsum inert with respect to the polymer. Non-ethoxylated lauryl sulfates are typically available in liquid form at 28-30% concentration.

To prepare the latex compound being tested, the latex was measured out to give 100 dry grams (for example, latex manufactured by the Goodyear Tire and Rubber Company is typically 52.0% concentrated and would require 192.3 grams of wet latex for 100 dry grams). Dilution water is then added to the latex; this is an adjustment to get the desired final compound concentration of about 83%.

The filler is added to the diluted latex under agitation. The filler is typically 50% to 55% −325 mesh and less than 6% +60 mesh. The amount of filler added depends upon the loading required. The loading may vary from 300 to 600 phr depending upon the application. For the purposes of these tests, 600 grams of filler was added.

After thoroughly mixing the filled latex, a froth aid is added as dictated by the particular formulation. This is usually an emulsion which enables the compound to be frothed with air and maintain bubble stability.

Frothing reduces the amount of compound required for the carpet backing.

These emulsions, also referred to as soaps, also aid in the theological stability of the compound.

The final addition to the compound is the thickening agent, usually a sodium polyacrylate, which is used to adjust the viscosity of the compound.

The compound is typically adjusted from a viscosity range of 1000 to 3000 cps to the range of approximately 10,000 to 18,000 cps.

The compounding procedure with gypsum deviates slightly from the procedure just described. The chemical treatment used to make the gypsum compatible with the latex is dissolved into the dilution water prior to the addition of the dilution water to the latex. The gypsum and limestone are not blended together prior to the addition of the diluted latex. The gypsum is added first, followed by the limestone. The dilution water is calculated with consideration made for the solid content of the chemical to maintain the desired final concentration. During the testing of the preparations, a "standard" froth aid (Stanfax 1701-C) and a thickening agent (Paragum P-147) are used for all latexes. The dosage of the froth aid varied from 1.7 to 2.0 phr depending upon the latex used. The thickener dosage varied depending upon the latex and the chemical treatment.

The compound stability is measured over time, typically by measuring the viscosity each day until the compound is rheologically unfit. The prepared compounds are stored in plastic quart cups with airtight lids to prevent moisture loss. There are two measured viscosities that were taken each day, static viscosity and stirred viscosity.

The static viscosity was taken prior to any shear application to the compound (no stirring or agitation); the compound is then moderately hand stirred with a spatula for 30 seconds and the viscosity is then re-checked.

All viscosities are done with a Brookfield Synchro-Lectric Viscometer, model RVF at a rotational speed of 20 rpm with a #5 (below 20,000 cps) or a #6 spindle (above 20,000 cps). The instrument dial is read on the eighth rotation and the viscosity is computed using the spindle constant multiplied by the dial reading.

The latex pHs may range from approximately 8.0 to 9.5, with the typical finished compound having a pH of approximately 7.0 to 8.5. No pH adjustment is specifically made to the compounds and compounding is done under ambient conditions.

The table below indicates the results of the initial stability test.

| Latex | ALS | SLS | SHMP | Stability Results |
|---|---|---|---|---|
| Dow #1 | 0.00 | 0.17 | 0.0 | 7+ days |
| #2 | 0.13 | 0.04 | 0.0 | 7+ days |
| #3 | 0.04 | 0.13 | 0.0 | 7+ day |
| #4 | 0.17 | 0.00 | 0.0 | 7+ days |
| BASF #1 | 0.15 | 0.05 | 0.0 | 5 days |
| #2 | 0.00 | 0.20 | 0.0 | 5 days |
| #3 | 0.20 | 0.00 | 0.0 | 5 days |
| #4 | 0.13 | 0.07 | 0.0 | 5+ days |
| #5 | 0.07 | 0.13 | 0.0 | 5+ days |
| Reichhold #1 | 0.00 | 0.15 | 0.5 | 5 days |

The table, along with the attached compound stability graphs, (FIGS. 1–7) which correspond to the table above and the statistics given below, indicates that each latex requires different chemical dosages and that each latex compound displays different stability performance. Stability for these compounds is defined as maintaining a workable rheology with preferably a static viscosity that doesn't exceed 20,000 cps and a stirred viscosity that stays reasonably close to the initial finished viscosity (2,000 to 3,000 cps).

It should be noted that industrial compounders usually pump the thickened compound with air pressure. Thus, the static viscosity should remain low enough to be movable. The movement through the pipeline will provide some shear and lower the viscosity, which is simulated by the moderate hand stirring of the samples.

The following tables show the results of a series of experiments in which the latex used and the amounts of ammonium or sodium lauryl sulfates added to the preparations were varied. An explanation of the charts is as follows:

Latex abbreviations:
Dow=D
Reichhold=R
BASF=B
Gencorp=GC
Goodyear=G is taken following 5 minutes of agitation (electric stirrer) after the froth aid addition.
Soap (g):
The froth aid, Stanfax 1701-C.
Paragum (g):
Thickening agent, P-147.
A.T.V. (cps):
The final compound viscosity after thickening. Below the A.T.V. column are the daily viscosity checks (static/stirred). The daily stability results are given in cps (×1000).

| Sample # | 1D | 2D | 3D | 4D | 1B | 2B | 3B | 4B | 5B | 1R |
|---|---|---|---|---|---|---|---|---|---|---|
| LATEX (g) (———) | 188.7 | 188.7 | 188.7 | 188.7 | 186.2 | 186.2 | 186.2 | 186.2 | 186.2 | 178.6 |
| Filler 1 (g) (_A-1_) | 300.0 | 300.0 | 300.0 | 300.0 | 300 | 300 | 300 | 300 | 300 | 300 |
| Filler 2 (g) (_FR-50_) | 300.0 | 300.0 | 300.0 | 300.0 | 300 | 300 | 300 | 300 | 300 | 300 |
| SHMP (g) | | | | | | | | | | (.15) .5 |
| ALS (g) | (.15) .5 | (.126) .42 | (.042) .14 | (.168) .56 | (.15) .5 | 0 | (.2) .67 | (.134) .45 | (.066) .22 | 0 |
| WATER (g) | 46.6 | 46.3 | 46.3 | 46.3 | 49.9 | 49.9 | 49.9 | 49.9 | 49.9 | 59.1 |
| OTHER (g) (_SLS_) | (.17) .57 | (.042) .14 | (.126) .42 | 0 | (.05) .17 | (.20) .67 | 0 | (.066) .22 | (.134) .45 | (.15) .5 |
| SOAP 1701-C (g) | 5.4 | (2) 5.4 | (2) 5.4 | (2) 5.4 | (2) 5.4 | 5.4 | 5.4 | 5.4 | 5.4 | (1.67) 4.5 |
| A.F.V. (cps) | 3100 | 3500 | 3400 | 3200 | 950 | 1000 | 1000 | 950 | 950 | 1,600 |
| PARAGUM 147 (g) | (.8) .6 | 6.6 | 6.6 | 6.6 | (.6) 4.6 | 4.45 | (.6) 4.6 | (.6) 4.7 | (.6) 4.6 | (.46) 4.0 |
| A.T.V. (cps) | 14,000 | 13,500 | 13,700 | 13,600 | 13,600 | 14,700 | 14,100 | 14,500 | 15,400 | 14,100 |
| Day 1 | 23.0/15.6 | 19.1/14.3 | 19.9/15.1 | 19.6/14.6 | 18.9/15.3 | 18.3/13.6 | 18.8/13.7 | 18.6/14.4 | 18.6/14.7 | 17.1/13.2 |
| Day 2 | 16.2/13.8 | 17.1/13.4 | 17.1/14.2 | 16.5/14.3 | 19.6/14.4 | 18.9/13.7 | 18.7/14.6 | 18.1/14.1 | 18.4/14.4 | 17.7/13.9 |
| Day 3 | 17.1/14.1 | 15.0/13.6 | 16.6/14.5 | 15.4/14.7 | 19.8/15.0 | 17.3/13.3 | 18.5/15.2 | 18.0/15.6 | 18.4/14.9 | 18.1/14.6 |
| Day 4 | 16.6/15.1 | 16.8/13.9 | 18.3/15.4 | 17.2/15.5 | 19.9/17.4 | 18.4/13.7 | 18.0/14.6 | 17.8/15.9 | 18.5/15.8 | 18.9/15.2 |
| Day 5 | 15.2/14.2 | 15.6/13.8 | 16.4/15.8 | 16.2/15.4 | 20+/18.9 | 20+/18.2 | 19.9/16.0 | 22.0/16.0 | 18.8/15.6 | 22.0/18.0 |
| Day 6 | 14.8/13.8 | 15.0/14.0 | 17.1/15.7 | 16.5/15.9 | — | — | 19.5/17.9 | 23.0/18.4 | 23.0/19.0 | |
| Day 7 | 15.1/13.9 | 14.1/13.2 | 15.8/15.0 | 15.6/15.3 | | | | | | |
| Day 8 | 17.1/15.2 | — | — | — | | | | | | |
| Day 9 | 15.1/15.5 | — | — | — | | | | | | |

Latex (g):
The weight of the wet latex for 100 dry grams.
Filler 1 (g):
The weight of one of the filler components; this is usually the limestone component, Amical-1, designated as A-1.
Filler 2 (g):
Same as filler 1, usually the gypsum component, FR50.
SHMP (g):
The weight of sodium hexametaphosphate used; this space on the chart is often used for another chemical and will noted as such, accordingly.
Water (g):
The weight of the dilution water (all compounds were made to approximately 83% concentration).
Other (g):
The weight of a chemical component as noted on the line below in the parentheses. All chemical weights shown are wet weights; the active weight is usually shown to the left in parentheses.
A.F.V. (cps):
After filler viscosity is usually measured prior to the addition of the froth aid as mentioned in the laboratory procedure. However, the froth aid helps in the wet out of the gypsum-blend filler and the A.F.V.

Figure 1:
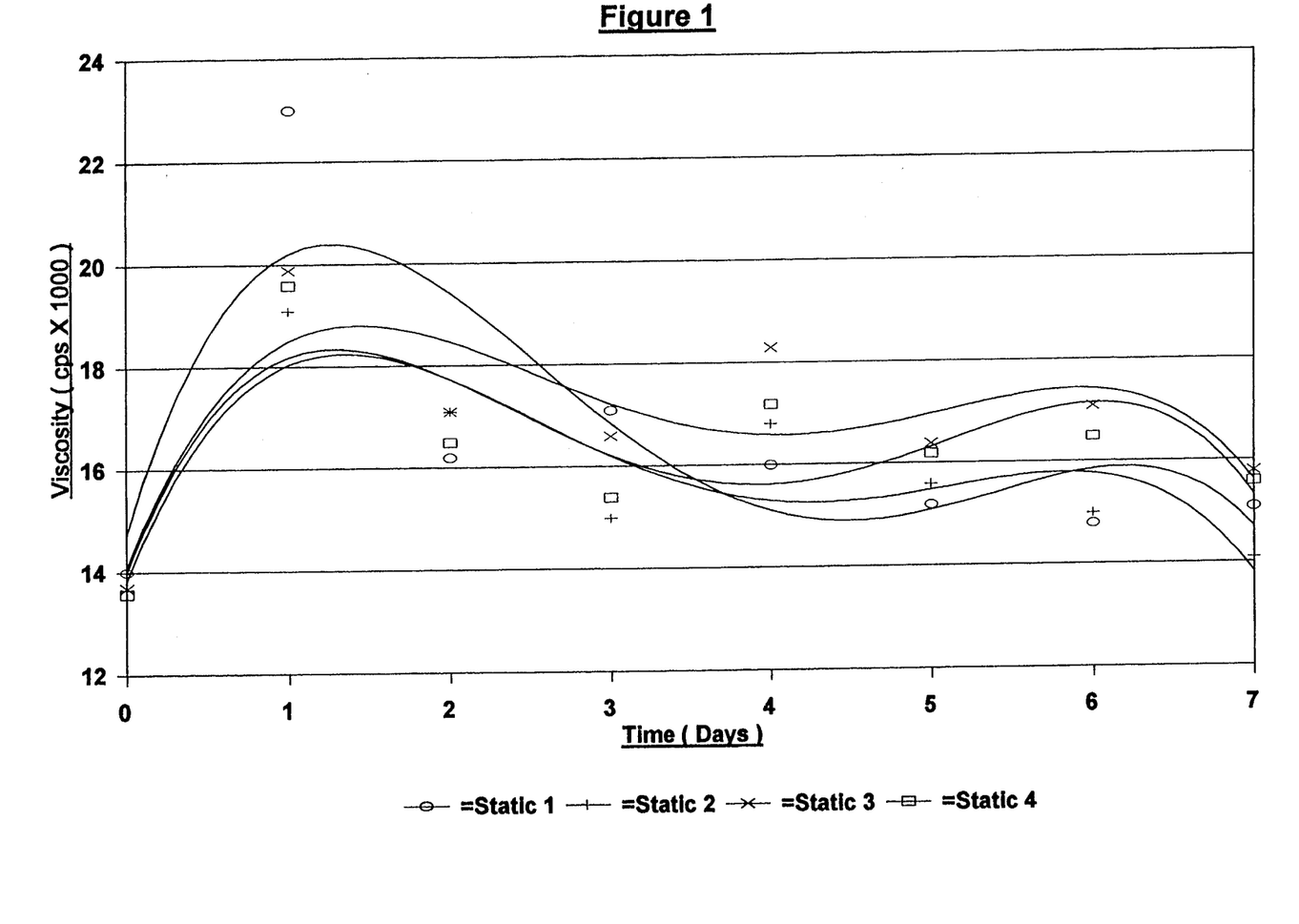
FIG. 1 is a graph of the static viscosity of the Dow compound using both ammonium lauryl sulfate and sodium lauryl sulfate in varying amount as detergents.
Figure 2:
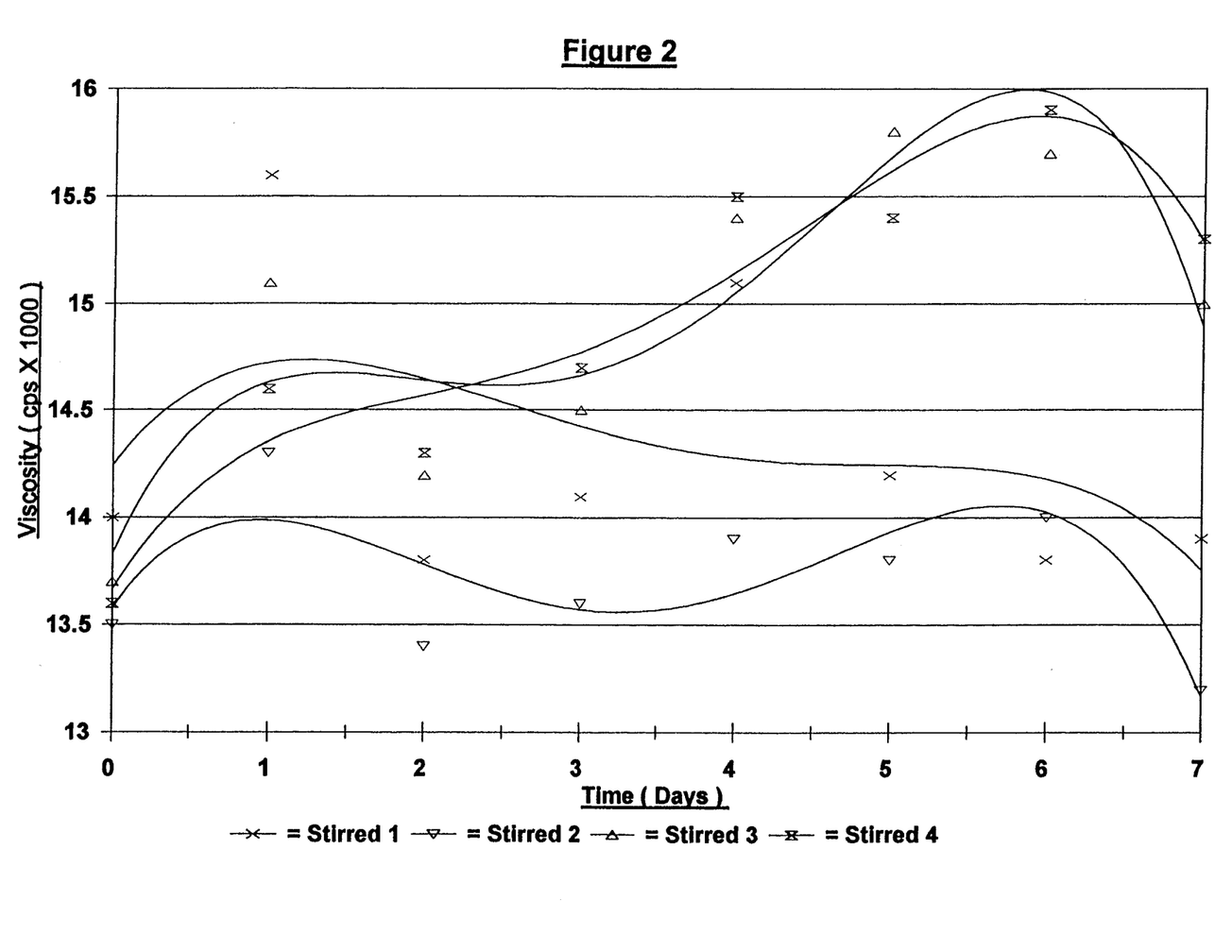
FIG. 2 is a graph of the stirred viscosity of the Dow compound using combinations both ammonium lauryl sulfate and sodium lauryl sulfate in varying amounts as detergents.
Figure 3:
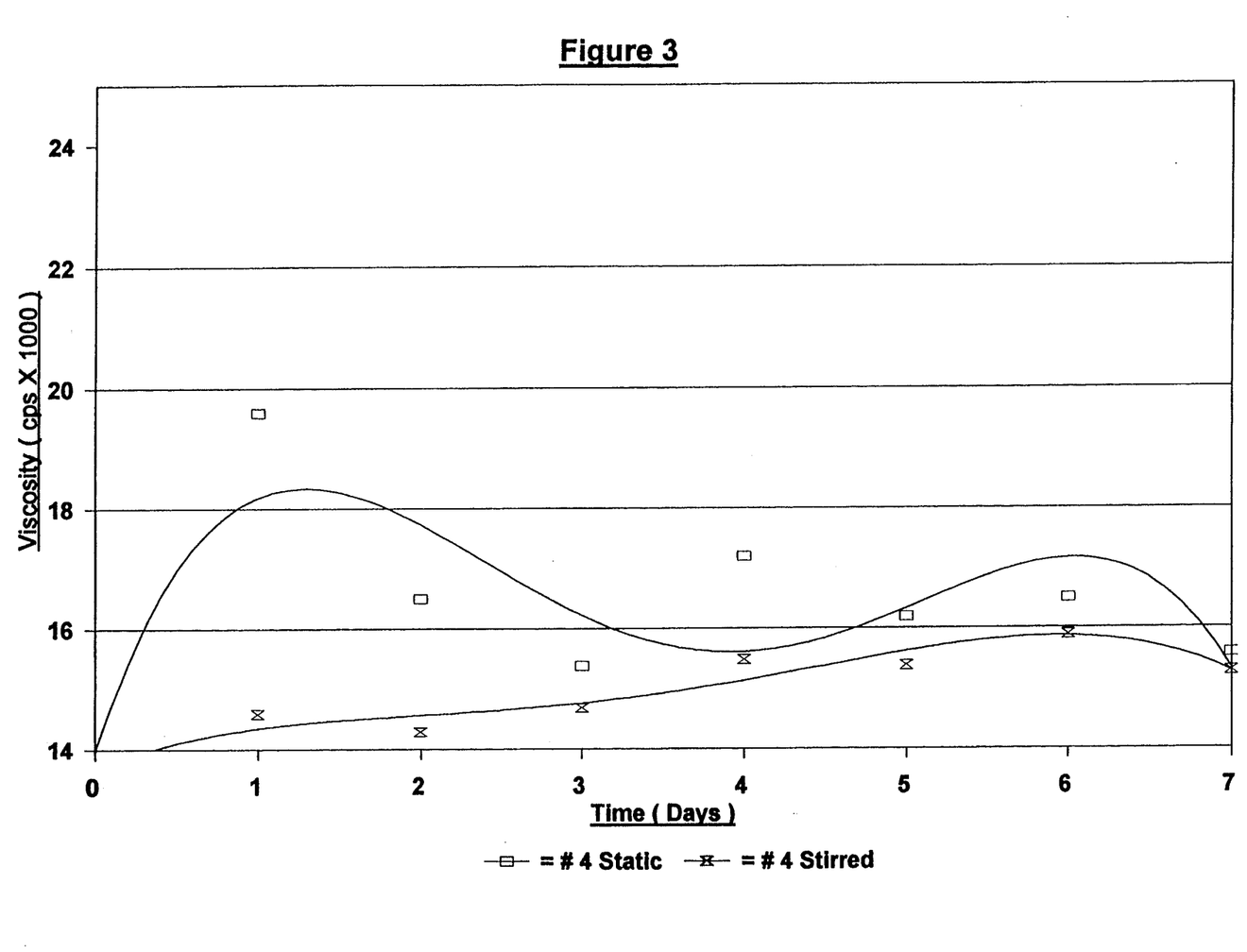
FIG. 3 is a graph of the static and stirred viscosity of the Dow compound using only ammonium lauryl sulfate.
Figure 4:
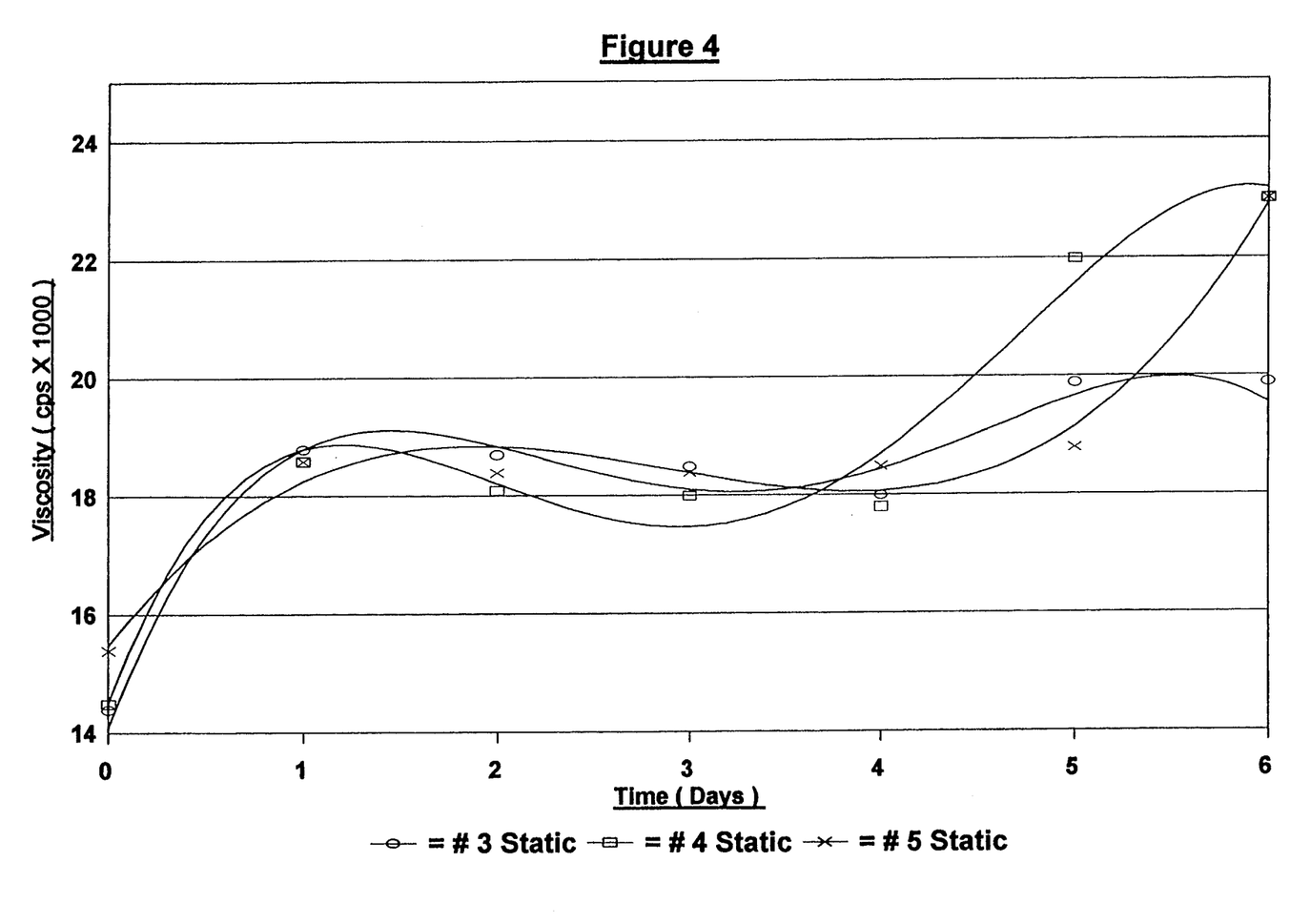
FIG. 4 is a graph of the static viscosity of the BASF compound using combinations of both ammonium lauryl sulfate and sodium lauryl sulfate in varying amounts as detergents.
Figure 5:
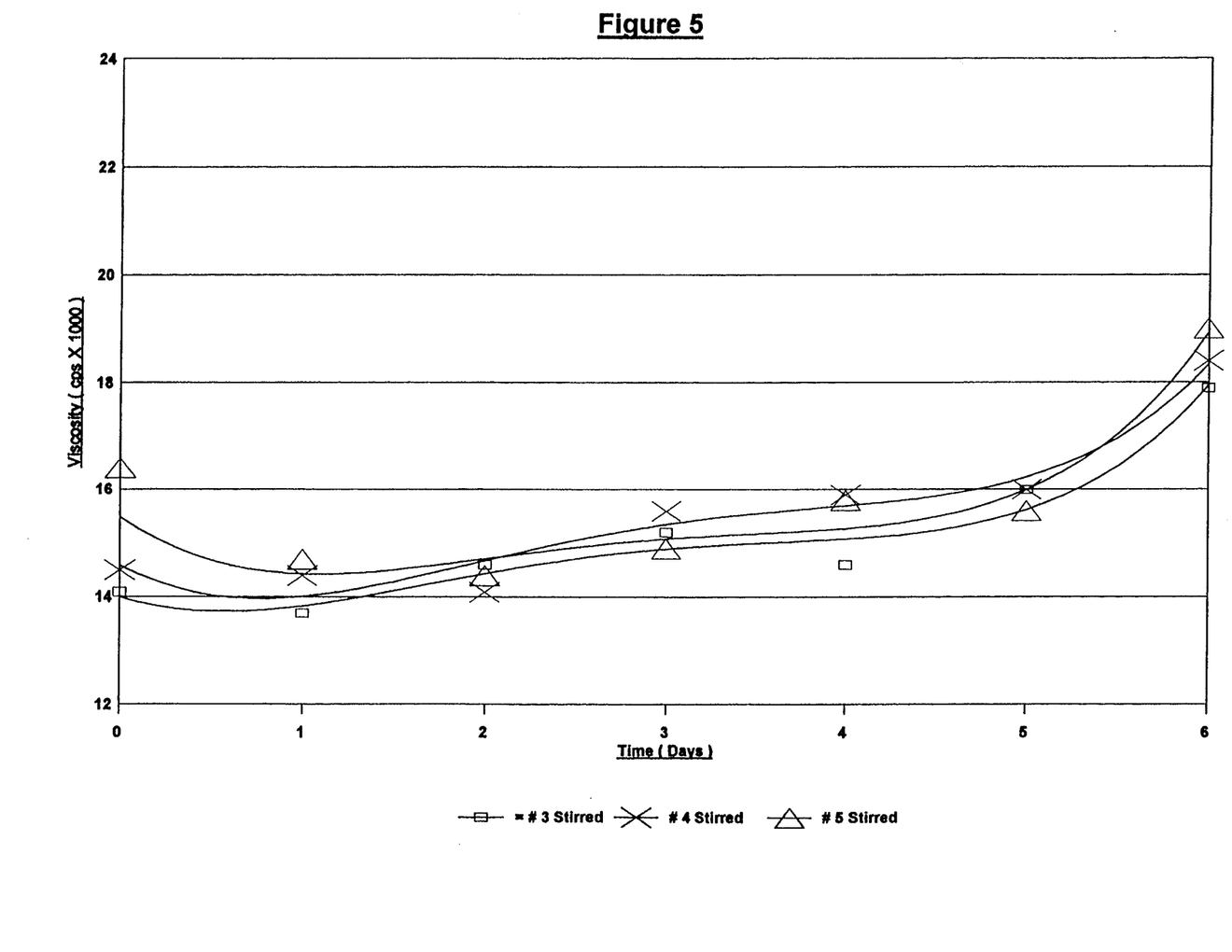
FIG. 5 is a graph of the stirred viscosity of the BASF compound using combinations of both ammonium lauryl sulfate and sodium lauryl sulfate in varying amounts as detergents.
Figure 6:
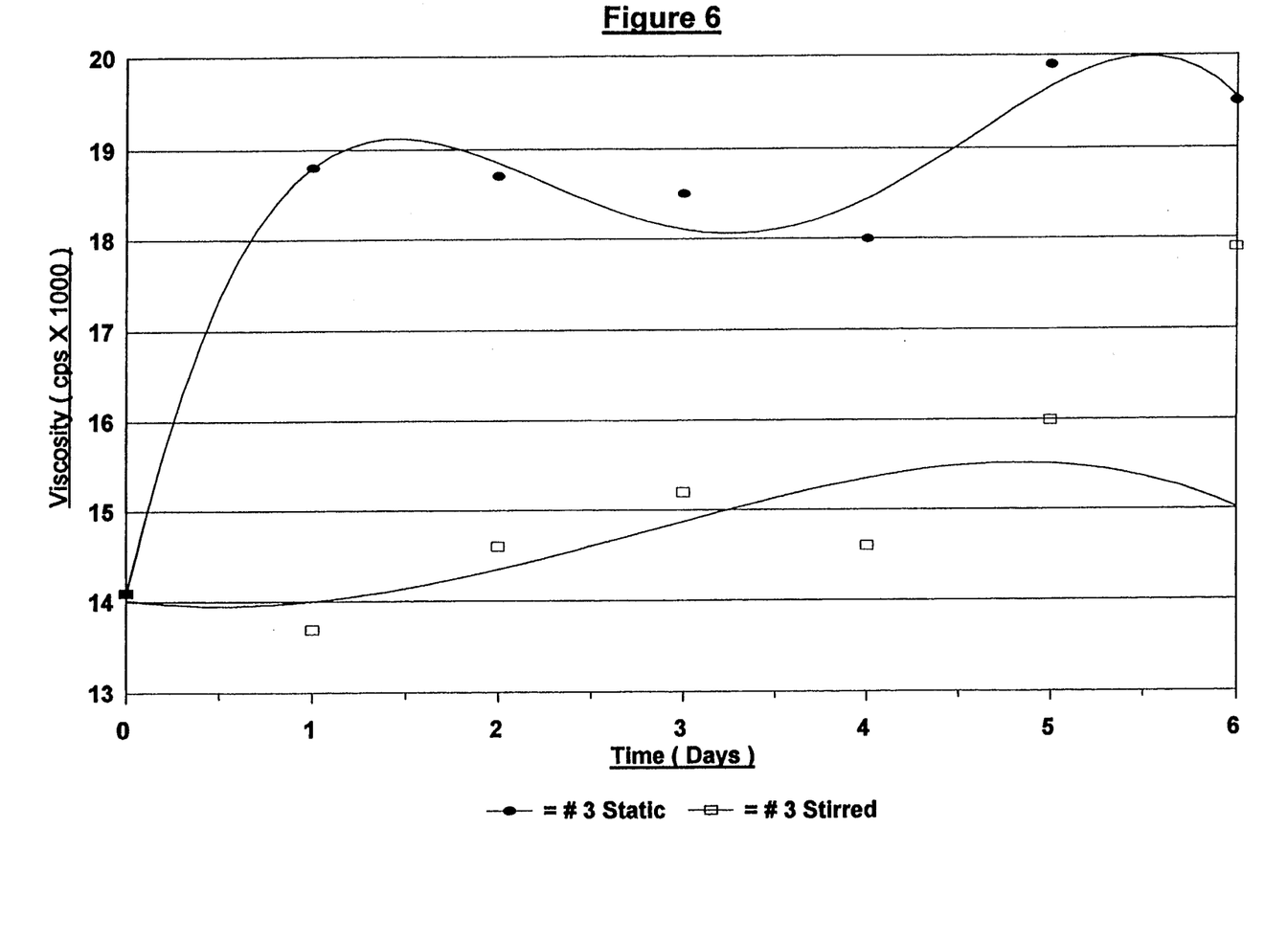
FIG. 6 is a graph of the stirred viscosity of the BASF compound using only ammonium lauryl sulfate as a detergent.

As shown by the results above, the Dow latex will remain stable the longest, for at least 10 days (stability testing being stopped at this point), when properly treated. However, an unusual feature of the Dow latex using this chemical treatment for the incorporation of gypsum is the sharp increase of the static viscosity followed by a gradual decline, which is mirrored to a lesser extent by the stirred viscosities (FIGS. 1–3). This gypsum latex preparation remains stable with a dosage rate of 0.17 active phr lauryl sulfate.

With the BASF latex, the static viscosity initially rises (FIGS. 4–6) sharply without the gradual decline shown by the Dow latex. The stirred viscosity gradually rises, with larger increases usually beginning at the 5 day mark. BASF latex requires at least 0.20 active parts phr of lauryl sulfate.

Figure 7:
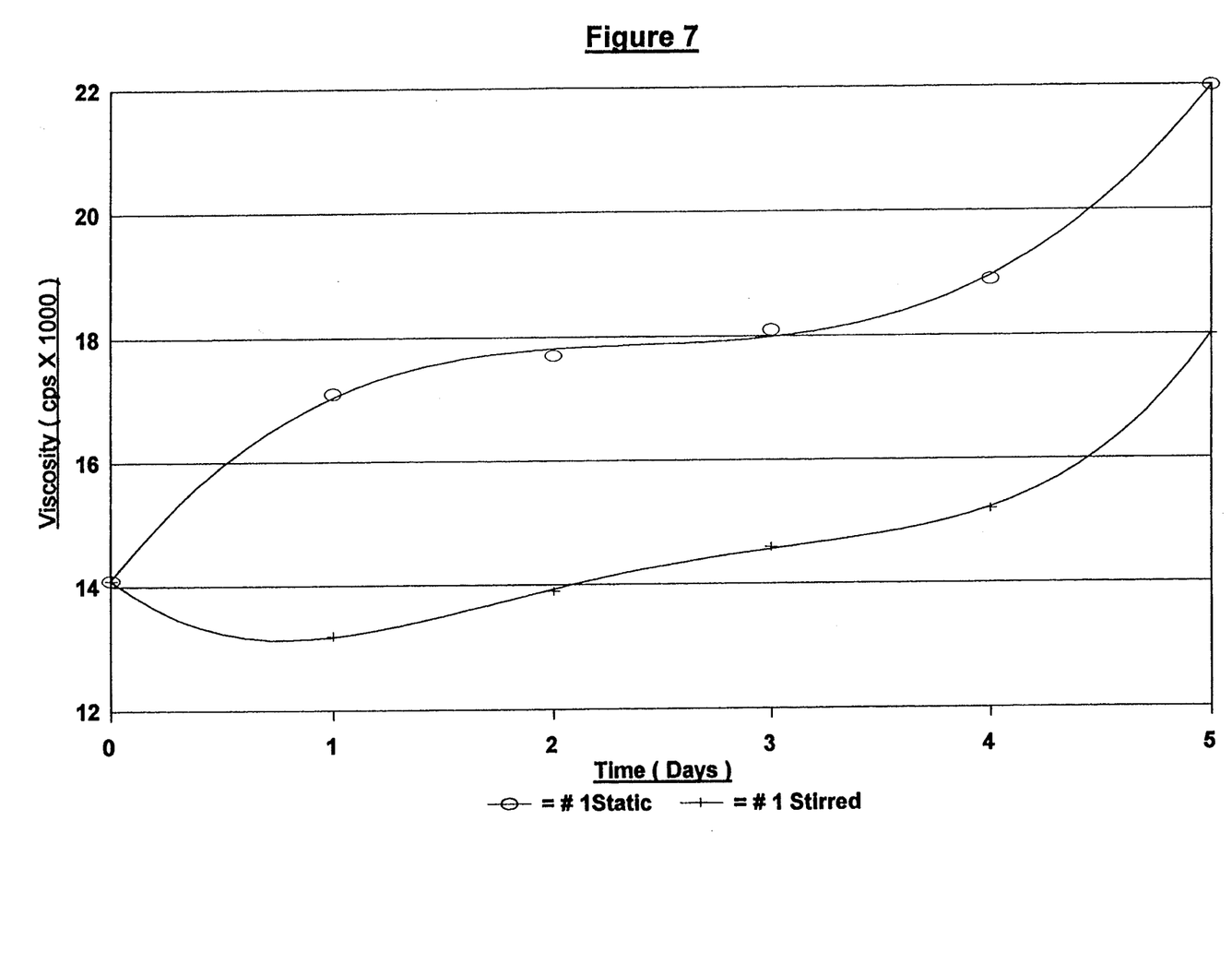
FIG. 7 is a graph of the static and stirred viscosity of the Reichhold compound using only sodium lauryl sulfate and SHMP as the detergent.

The Reichhold latex does not perform as well as the Dow or BASF latex do with ammonium lauryl sulfate and requires sodium hexametaphosphate for adequate dispersal (FIG. 7).

Additional tests were conducted to determine the advantages of using ethoxylated lauryl sulfates (laureth sulfates) to incorporate gypsum into latex. The results of these tests are given in the chart below.
Steol CS-130=sodium laureth sulfate, containing one mole of ethylene oxide, with 30% activity.

Steol CA-130=ammonium laureth sulfate, containing one mole of ethylene oxide, with 30% activity.
Steol CA-230=ammonium laureth sulfate, containing two moles of ethylene oxide, with 30% activity.
Steol CS-460=sodium laureth sulfate, containing four moles of ethylene oxide, with 60% activity.
Steol CA-460=ammonium laureth sulfate, containing four moles of ethylene oxide, with 60% activity.

|  |  | Dow | BASF | Reichhold | Gencorp |
|---|---|---|---|---|---|
| Latex | (g) | 100.0 | 100.0 | 100.0 | 100.0 |
| Amical-1 | (g) | 300.0 | 300.0 | 300.0 | 300.0 |
| FR-50 | (g) | 300.0 | 300.0 | 300.0 | 300.0 |
| Water | (g) | 43.6 | 49.9 | 58.6 | 34.1 |
| 1701-C | (g) | 2.0 | 2.0 | 1.7 | 2.0 |
| ALS | (g) | .17 | .20 | 0.0 | 0.0 |
| CS-130 | (g) | 0.0 | 0.0 | .15 | 0.0 |
| CS-460 | (g) | 0.0 | 0.0 | 0.0 | 2.0 |
| SHMP | (g) | 0.0 | 0.0 | 0.50 | 3.0 |
| Viscosity | (cps) | 13,600 | 14,100 | 14,200 | 13,300 |

| STABILITY RESULTS (cps × 1000) | | | | |
|---|---|---|---|---|
|  | Dow | BASF | Reichhold | Gencorp |
| Day 1 | 19.6/14.6 | 18.8/13.7 | 16.4/11.8 | 18.7/15.0 |
| Day 2 | 16.5/14.3 | 18.7/14.6 | 15.2/11.8 | 18.9/17.4 |
| Day 3 | 15.4/14.7 | 18.5/15.2 | 15.8/11.9 | 19.3/17.7 |
| Day 4 | 17.2/15.5 | 18.0/14.6 | 17.6/14.4 | 19.5/17.2 |
| Day 5 | 16.2/15.4 | 19.9/16.0 | 18.6/15.5 | 23.0/16.1 |
| Day 6 | 16.5/15.9 | 19.5/17.9 | 21.3/17.5 | — |
| Day 7 | 15.6/15.3 | — | — | — |
| Day 10 | 16.7/15.2 | — | — | — |

NOTE:
Static/Stirred Viscosities

Other results were as follows:

|  | GY #1 | GY #2 | BASF #1 | BASF #2 |
|---|---|---|---|---|
| Latex (g) | 193.1 | 193.1 | 186.2 | 186.2 |
| Amical-1 (g) | 300.0 | 300.0 | 300.0 | 300.0 |
| FR-50 (g) | 300.0 | 300.0 | 300.0 | 300.0 |
| Water (g) | 37.8 | 35.8 | 49.9 | 49.9 |
| 1701-C (g) | 5.4 | 5.4 | 5.4 | 5.4 |
| SLS (g) | 0 | 3.3 | — | — |
| CA-130 (g) | 0 | 0 | 0.8 | 0.0 |
| CA-230 (g) | 0 | 3.9 | 0.0 | 0.8 |
| CS-130 (g) | 0 | 0 | 0 | 0 |
| CS-460 (g) | 3.8 | 3.4 | 0 | 0 |
| SHMP (g) | 0 | 0 | 0 | 0 |
| A.F.V. (cps) | 1900 | 2200 | 900 | 900 |
| Paragum 147 (g) | 7.8 | 7.7 | 7.5–4.8 | 4.5 |
| A.T.V. (cps) | 13,300 | 13,500 | 15,500 | 14,000 |

| STABILITY RESULTS (cps × 1000) | | | | |
|---|---|---|---|---|
|  | GY #1 | GY #2 | BASF #1 | BASF #2 |
| Day 1 | 17.3/14.0 | 17.6/15.3 | 19.4/14.4 | 17.8/13.6 |
| Day 2 | 17.9/14.2 | 16.8/15.9 | 19.5/16.6 | 19.3/14.0 |
| Day 3 | 18.7/15.2 | 17.0/16.0 | 19.4/14.6 | 18.9/14.0 |
| Day 4 | 21.5/16.5 | 19.5/17.0 | 19.5/17.3 | 19.9/16.0 |
| Day 5 | 19.5/16.6 | 19.1/17.0 | 26.25/19.8 | 23/19.1 |
| Day 6 | 24.0/17.7 | 22.75/17.0 | Discard | Discard |

Figure 8:
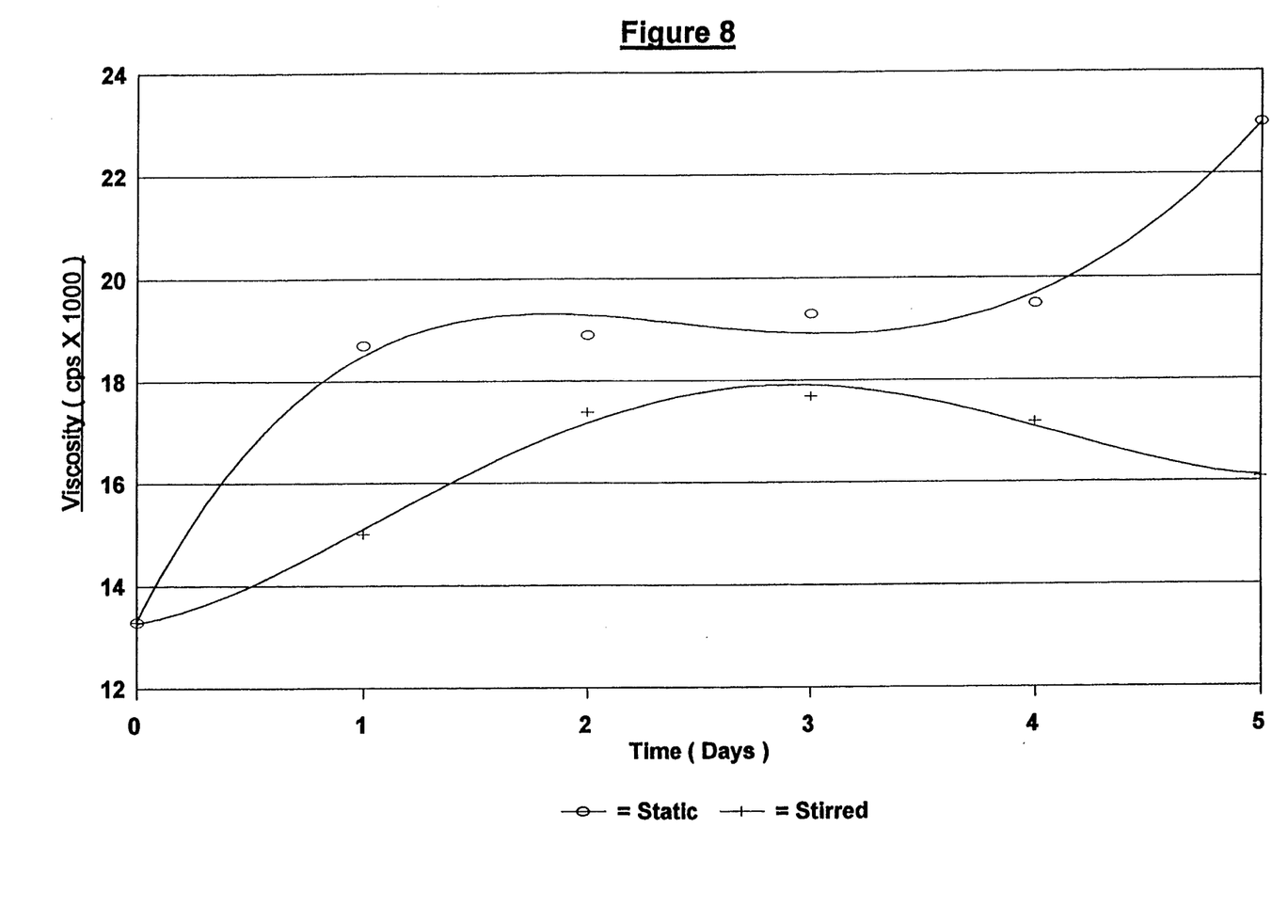
FIG. 8 is a graph of the static and stirred viscosity results of the Gencorp compound using sodium laureth sulfate and SHMP as the detergent.
Figure 9:
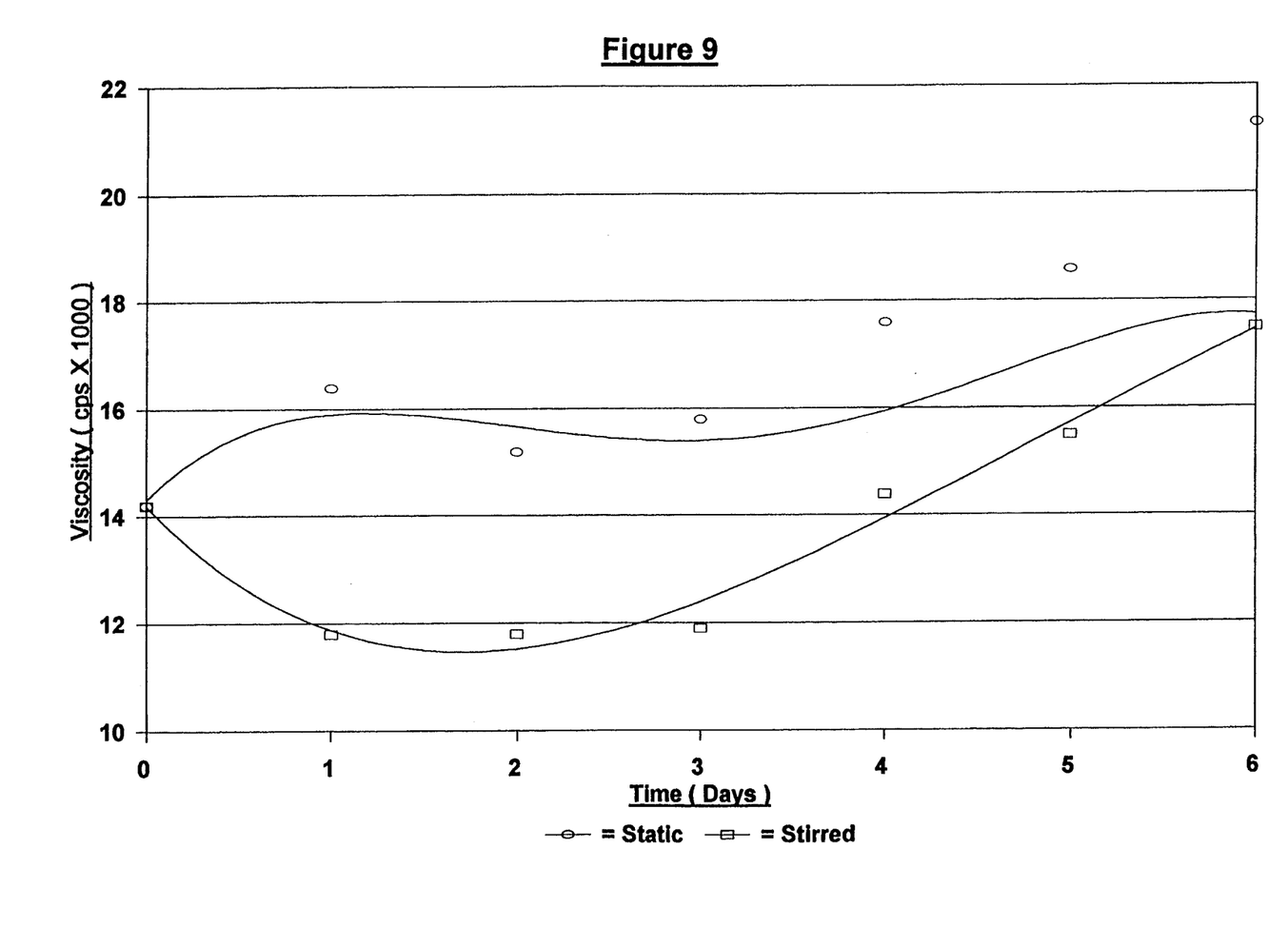
FIG. 9 is a graph of the static and stirred viscosity results of one of the test runs of the Reichhold compound using sodium laureth sulfate and SHMP as the detergent.

Subsequent testing indicated no advantage to using laureth sulfates with Dow or BASF latexes. However, there was increased stability of the Gencorp (FIG. 8) and Reichhold latexes (FIG. 9) when laureth sulfates were added.

The Goodyear latexes are also shown to be stable for at least 6 days when a highly molar concentration of sodium laureth sulfate is added. Although particular embodiments of the present invention have been described and illustrated herein, it should be recognized that modifications and variations may readily occur to those skilled in the art and that such modifications and variations may be made without departing from the spirit and scope of the invention. Consequently, the invention as claimed below may be practiced otherwise than as specifically described below.

What is claimed is:

1. A composition which allows for calcium sulfate dihydrate to be maintained in an aqueous solution comprising calcium sulfate dihydrate, water, and a detergent blend, said detergent blend being selected in part from the group consisting of lauryl sulfate and laureth sulfate.

2. A composition according to claim 1, wherein said lauryl sulfate is comprised of a mixture of 0–100% by weight ammonium lauryl sulfate and 0–100% by weight sodium lauryl sulfate.

3. A composition according to claim 1, wherein said laureth sulfate is comprised of a mixture of 0–100% by weight ammonium laureth sulfate and 0–100% sodium laureth sulfate.

4. A composition according to claim 1, wherein the detergent blend is further comprised of a dispersant selected from the group consisting of sodium hexametaphosphate and tetrasodium pyrophosphate.

5. A composition for the incorporation of calcium sulfate dihydrate as a filler material in latex, comprising calcium sulfate dihydrate, latex, and a detergent blend, said detergent blend selected in part from the group consisting of lauryl sulfate and laureth sulfates.

6. A composition for the incorporation of calcium sulfate dihydrate according to claim 5, wherein the latex is comprised of an aqueous polymer dispersion.

7. A composition for the incorporation of calcium sulfate dihydrate according to claim 6, wherein the lauryl sulfate is comprised of a mixture of 0–100% by weight ammonium lauryl sulfate and 0–100% by weight sodium lauryl sulfate.

8. A composition for the incorporation of calcium sulfate dihydrate according to claim 6, wherein the laureth sulfate is comprised of a mixture of 0–100% by weight ammonium laureth sulfate and 0–100% by weight sodium laureth sulfate.

9. A composition for the incorporation of calcium sulfate dihydrate according to claim 6, wherein the detergent blend is further comprised of a dispersant selected from the group consisting of sodium hexametaphosphate and tetrasodium pyrophosphate.

10. A composition for the incorporation of calcium sulfate dihydrate according to claim 6, wherein said calcium sulfate dihydrate comprises up to 100% of the filler blend.

11. A composition for the incorporation of calcium sulfate dihydrate according to claim 6, wherein said calcium sulfate dihydrate is mixed with calcium carbonate as part of said filler.

12. A composition for the incorporation of calcium sulfate dihydrate according to claim 7, wherein said mixture of ammonium and sodium lauryl sulfate has an active dosage rate of approximately 0.1 to 5.0 phr.

13. A composition for the incorporation of calcium sulfate dihydrate according to claim 8, wherein said mixture of ammonium and sodium laureth sulfate has an active dosage rate of approximately 0.1 to 5.0 phr.

14. A composition for the incorporation of calcium sulfate dihydrate according to claim 6, wherein approximately 50 phr to 600 phr of calcium sulfate dihydrate are added to latex.

15. A composition for the incorporation of calcium sulfate dihydrate according to claim 6, wherein the size of the calcium sulfate dihydrate is approximately 50% to 55% −325 mesh.

16. A composition for the incorporation of calcium sulfate dihydrate according to claim 6, further comprising the addition of approximately 1 phr to 2 phr froth aid, thereby enabling the compound to be frothed with air and maintain bubble stability.

17. A composition for the incorporation of calcium sulfate dihydrate according to claim 6, further comprising a thickening agent to adjust the viscosity of said composition.

18. A composition for the incorporation of calcium sulfate dihydrate according to claim 6, wherein said thickening agent is a sodium polyacrylate.

19. A composition for the incorporation of calcium sulfate dihydrate according to claim 6, wherein said composition has a final viscosity rate of approximately 10,000 cps to 18,000 cps.

20. A composition for the incorporation of calcium sulfate dihydrate according to claim 9, wherein the composition in its final form has a pH of approximately 7.0 to 8.5.

21. A method for the incorporation of calcium sulfate dihydrate as a filler material in latex, comprising the steps of:
preparing a concentrated latex solution;
adding to water a detergent blend selected in part from the group consisting of lauryl sulfate and laureth sulfates, to be used to dilute said concentrated latex solution;
adding said dilution water to said concentrated latex solution, thereby diluting said concentrated latex solution;
adding calcium sulfate dihydrate to said diluted latex solution while agitating said latex solution; and,
mixing said filled latex solution.

22. A method for the incorporation of calcium sulfate dihydrate according to claim 21, wherein said latex used is comprised of an aqueous polymer dispersion.

23. A method for the incorporation of calcium sulfate dihydrate according to claim 22, further comprising the steps of adding a froth aid after the mixing of said filled latex solution and frothing said filled latex solution.

24. A method for the incorporation of calcium sulfate dihydrate according to claim 22, further comprising the step of adding a thickening agent.

25. A method for the incorporation of calcium sulfate dihydrate according to claim 22, wherein the thickening agent used is a sodium polyacrylate.

26. A method for the incorporation of calcium sulfate dihydrate according to claim 22, wherein said lauryl sulfate is comprised of a mixture of 0–100% by weight ammonium lauryl sulfate and 0–100% by weight sodium lauryl sulfate.

27. A method for the incorporation of calcium sulfate dihydrate according to claim 22, wherein said laureth sulfate is comprised of a mixture of 0–100% by weight ammonium laureth sulfate and 0–100% by weight sodium laureth sulfate.

28. A method for the incorporation of calcium sulfate dihydrate according to claim 22, further comprising the step of adding a dispersant with the detergent blend, said dispersant selected from the group consisting of sodium hexametaphosphate and tetrasodium pyrophosphate.

29. A method for the incorporation of calcium sulfate dihydrate according to claim 22, further comprising the step of adding calcium carbonate to the diluted latex solution after the addition of said calcium sulfate dihydrate.

30. A method for the incorporation of calcium sulfate dihydrate according to claim 22, wherein said mixture of ammonium and sodium lauryl sulfate is added to the water at an active dosage rate of approximately 0.1 to 5.0 phr.

31. A method for the incorporation of calcium sulfate dihydrate according to claim 22, wherein said mixture of ammonium and sodium laureth sulfate is added to the water at an active dosage rate of approximately 0.1 to 5.0 phr.

32. A method for the incorporation of calcium sulfate dihydrate according to claim 22, wherein approximately 50 phr to 600 phr of said calcium sulfate dihydrate are added to said diluted latex solution.

33. A method for the incorporation of calcium sulfate dihydrate according to claim 22, wherein said calcium sulfate dihydrate is approximately 50% to 55% −325 mesh in size.

34. A method for the incorporation of calcium sulfate dihydrate according to claim 23, wherein approximately 1 phr to 2 phr froth aid are added.

35. A method for the incorporation of calcium sulfate dihydrate according to claim 22, further comprising the step of adjusting the filled latex solution to a viscosity of approximately 3,000 cps to 18,000 cps.

* * * * *